(12) United States Patent
Chan et al.

(10) Patent No.: US 7,292,875 B2
(45) Date of Patent: Nov. 6, 2007

(54) ELECTRONIC DEVICE WITH AMBIENT LIGHT SENSOR

(75) Inventors: Serene Seok Peng Chan, Singapore (SG); Chee Kien Lim, Singapore (SG); Tammy Siew Hoon Ho, Singapore (SG); Wee Sin Tan, Singapore (SG)

(73) Assignee: Avago Technologies ECBU IP (Singapore) Pte Ltd, Singapore (SG)

( * ) Notice: Subject to any disclaimer, the term of this patent is extended or adjusted under 35 U.S.C. 154(b) by 134 days.

(21) Appl. No.: 10/954,405

(22) Filed: Sep. 30, 2004

(65) Prior Publication Data

US 2006/0073844 A1   Apr. 6, 2006

(51) Int. Cl.
*H04M 1/00*   (2006.01)

(52) U.S. Cl. ............... 455/550.1; 455/90; 455/466; 361/683; 361/681

(58) Field of Classification Search .......... 455/566, 455/90.3, 550.1, 90; 345/98, 207; 361/681–683
See application file for complete search history.

(56) References Cited

U.S. PATENT DOCUMENTS

| | | | |
|---|---|---|---|
| 5,867,140 A * | 2/1999 | Rader | 345/98 |
| 6,246,862 B1 | 6/2001 | Grivas et al. | |
| 6,571,086 B1 * | 5/2003 | Uusimaki | 455/90.3 |
| 6,687,515 B1 * | 2/2004 | Kosaka | 455/566 |
| 6,870,529 B1 * | 3/2005 | Davis | 345/207 |
| 6,885,849 B1 | 4/2005 | Kim et al. | |
| 2001/0030850 A1 * | 10/2001 | Ditzik | 361/683 |
| 2003/0013496 A1 | 1/2003 | Kim et al. | |
| 2005/0037815 A1 * | 2/2005 | Besharat et al. | 455/566 |

FOREIGN PATENT DOCUMENTS

| | | |
|---|---|---|
| EP | 1 071 263 A1 | 1/2001 |
| JP | 2003060744 A | 2/2003 |
| WO | WO 2003/100585 A1 | 12/2003 |

OTHER PUBLICATIONS

UK Patent Search Report, Application GB0519977.3, Jan. 19, 2006.

* cited by examiner

*Primary Examiner*—Joseph Feild
*Assistant Examiner*—Michael Vu

(57) ABSTRACT

An electronic device having a first piece, a second piece moveable between an open position and a closed position with respect to the first piece, and an ambient light sensor operable to detect ambient light when the second piece is not closed. The electronic device is operated in a first mode when the second piece is in an open position and in a second mode when the second piece is in the closed position.

15 Claims, 3 Drawing Sheets

ELECTRONIC DEVICE WITH AMBIENT LIGHT SENSOR

FIELD

This invention relates generally to the field of electronic devices. More particularly, this invention relates to an electronic device, such as a radiotelephone, having an ambient light sensor.

BACKGROUND

Electronic devices are often constructed of two pieces, the two pieces being moveable between an open position and a closed position with respect to each other. It is sometimes desirable to operate the electronic device in a different mode of operation when the two pieces are in the closed position. An example of such a device is a folding portable radiotelephone, also known as a clamshell phone or flip phone. The two-piece folding design, which has a first piece and second piece connected by a hinge, allows the portable radiotelephone to be compact and, when closed, the second piece provides protection for the keyboard and the display screen.

Other radiotelephones use a sliding second piece that provides similar functionality.

When the second piece is closed, the radiotelephone may be switched to a 'standby' mode of operation, in which the screen and other energy consuming operations are deactivated to conserve battery power, or switched off. Conventionally, a mechanical switch on the hinge is used to detect whether the second piece is open or closed. More recently, a Hall Effect sensor has been used to detect when the second piece is closed. However, mechanical switches are subject to failure after prolonged use and Hall Effect sensors, which use a magnetic field, may interfere with the radio of the radiotelephone.

Other electronic devices, such as PDA's and portable computers, also incorporate hinged, sliding or removable second pieces. It is also desirable to operate these devices in different modes depending upon whether the second piece is open or closed

SUMMARY

The present invention relates generally to electronic devices, such as portable radiotelephones and portable computers. Objects and features of the invention will become apparent to those of ordinary skill in the art upon consideration of the following detailed description of the invention.

One embodiment of the invention relates to a two-piece electronic device having a first piece and a second piece. The second piece is moveable between an open position and a closed position with respect to the first piece. An ambient light sensor, located in the second piece or the first piece, is operable to sense the position of the second piece. The electronic device is operated in a first mode when the second piece is in an open position and in a second mode when the second piece is in the closed position. The second mode may be a standby mode, in which the electronic device is operated at a lower power level as compared to the first mode.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

FIG. 1 is a representation of a radiotelephone in accordance with an embodiment of the invention.

FIG. 2 is a side view of an open radiotelephone in accordance with a further embodiment of the invention.

FIG. 3 is a side view of a closed radiotelephone in accordance with a further embodiment of the invention.

FIG. 4 is diagrammatic representation of a radiotelephone in accordance with an embodiment of the present invention.

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

One embodiment of the invention provides an electronic device that is operable in first and second modes. For example, the first mode may be an activated mode and the second mode may be a standby mode or an 'off' mode. The device comprises a first piece, a second piece moveable between an open position and a closed position with respect to the first piece and a processing circuit operable to control operation of the electronic device. An ambient light sensor is operable to sense the position of the second piece with respect to the first piece and to signal the processing circuit to operate the electronic device in the first mode and in the second mode when the second piece is closed.

The invention will be described with respect to a portable radiotelephone, however it will be apparent to those of ordinary skill in the art that the invention has application to a range of electronic devices including, but not limited to, clamshell and sliding-cover radiotelephones, computers, GPS receivers, PDA's, electronic calculators, wireless email devices, portable audio and video players, still and video cameras, pagers and gaming devices.

A representation of an exemplary folding radiotelephone is shown in FIG. 1. Referring to FIG. 1, folding radiotelephone 100 comprises a first piece 102, which may be a base, and a second piece 104, which may be a cover. The first piece may contain a keypad 106 and menu access device 108 for entering information into the radiotelephone and selecting functions of the radiotelephone. The second piece 104 contains a screen 110 for displaying telephone functions and other information. In one embodiment, the screen is a touch sensitive screen that may be used for entering user information or selecting telephone functions. The second piece also contains a speaker 112 for generating sound. The second piece is attached to the first piece by a hinge 114, so that the second piece may be moved to an open position (as shown in the figure) when the telephone is in use, or a closed position in which the second piece covers the first piece. An 'open position' is taken to mean any position that is not closed, and thus includes partially open positions.

A folding telephone is also referred to as a clamshell phone or a flip phone. However, it will be apparent to those of ordinary skill in the art that the present invention has application to other electronic devices having a first piece and a second piece. Further, the second piece may be moveable attached to the first piece or may be separable from the first piece.

Figure 1:
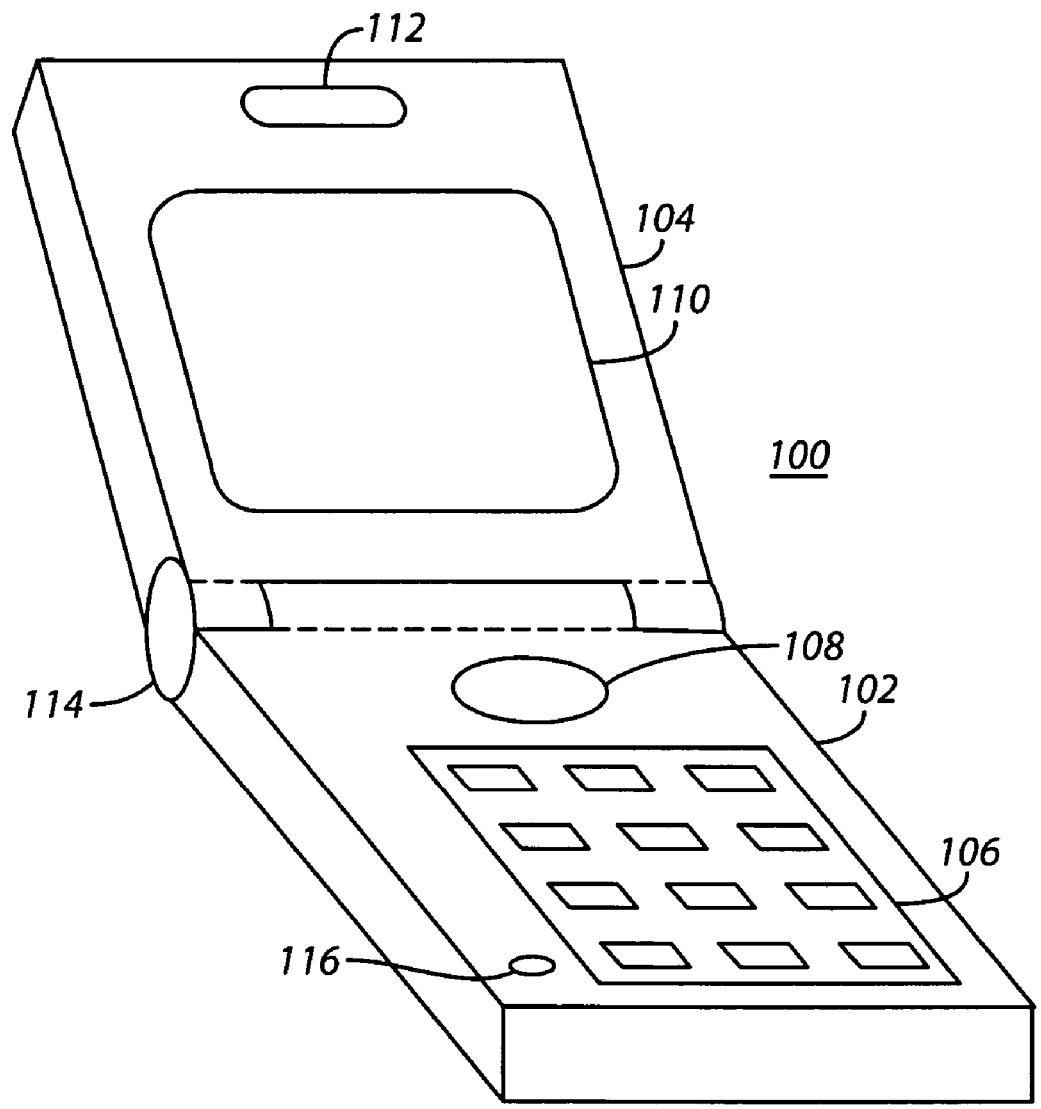

In accordance with a first aspect of the invention, the radiotelephone is equipped with an ambient light sensor, such as photoelectric sensor, that is operable to detect even low levels of ambient light. When the second piece is in a closed position, ambient light to the photoelectric sensor is blocked. In one embodiment, as shown in FIG. 1, the ambient light sensor 116 is located in the first piece. In a further embodiment, the ambient light sensor is located in the second piece. In this way, the electronic device may detect whether the second piece is in an open position or a closed position and select its mode of operation accordingly.

In one embodiment of the invention, the spectral sensitivity of the ambient light sensor is chosen to approximate the spectral intensity of the human eye and to have continuous sensitivity through a wide range of viewing angles.

In a further embodiment, the ambient light sensor generates an electrical signal in response to received ambient light and compares to the electrical signal to a threshold level to determine if ambient light is present. The threshold level is chosen such that even low levels of ambient light are detected.

Figure 2:
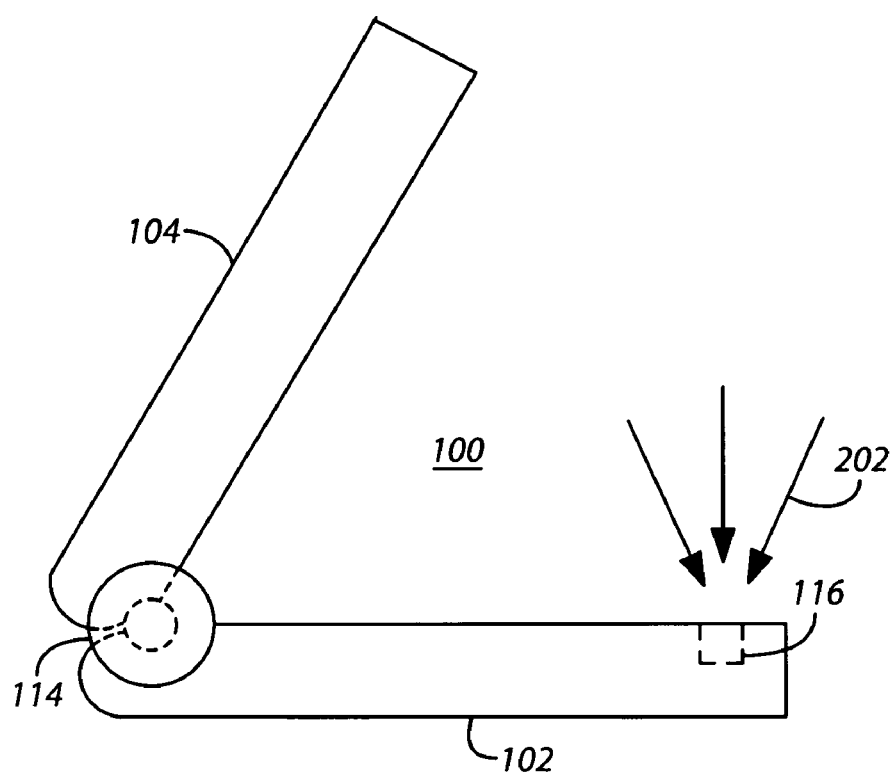

A side view of a radiotelephone is shown in FIG. 2. FIG. 2 shows the radiotelephone 100 with the second piece 104 in an open position relative to the first piece 102. In this embodiment of the invention, ambient light 202 is received by the ambient light sensor 116 located in the first piece 102 of the radiotelephone 100. When ambient light 202 is detected by the ambient light sensor 116 the radiotelephone is placed in an activated mode of operation. For example, the display screen (110 in FIG. 1) may be activated.

Figure 3:
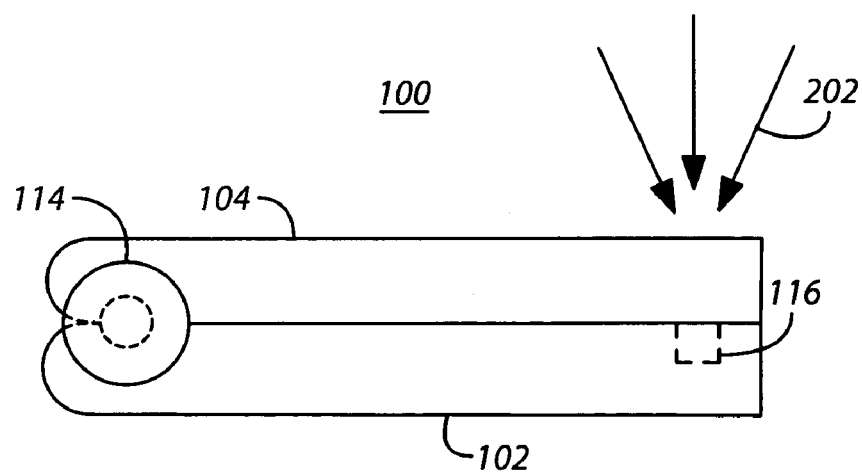

FIG. 3 shows the radiotelephone 100 with second piece 104 in a closed position relative to the first piece 102. When the second piece 104 is closed, ambient light 202 is blocked by the second piece and is not received by the ambient light sensor 116. The radiotelephone is deactivated or placed in a standby mode of operation. For example, the display screen (110 in FIG. 1) may be de-activated. In addition, other power-consuming functions of the radiotelephone may be deactivated or operated at a lower power level.

The ambient light sensor may be operated intermittently or continuously.

Figure 4:
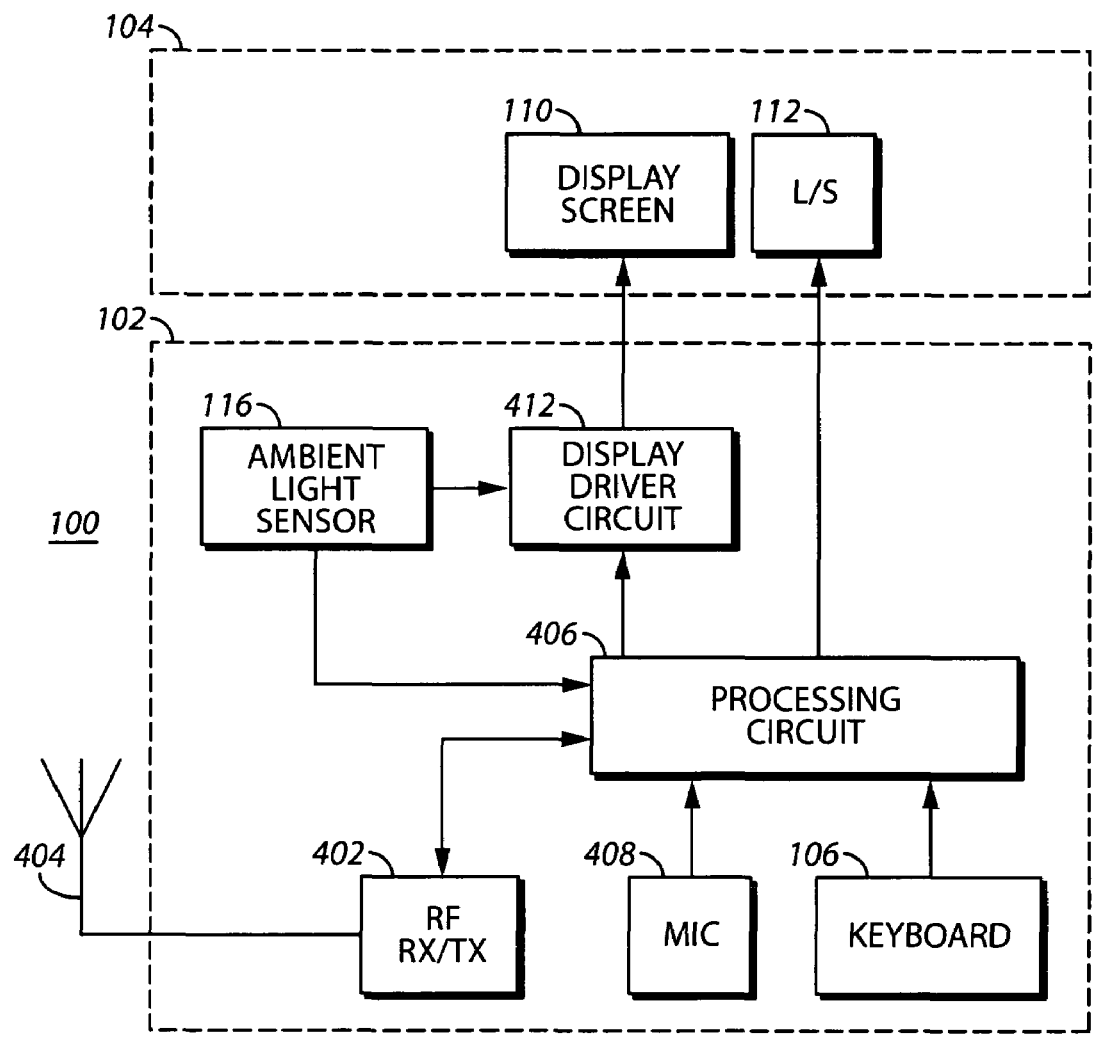

A diagrammatic representation of a radiotelephone in accordance with one embodiment of the present invention is shown in FIG. 4. Referring to FIG. 4, the radiotelephone 100 comprises a first piece 102 and a second piece 104. The first piece 102 contains a radiofrequency transceiver 402 that is coupled to an aerial 404. The radiofrequency transceiver is coupled to a processing circuit 406. The processing circuit 406 also receives audio information from microphone 408 and keyboard 106. The processing circuit controls display driver circuit 412 to drive a display screen 110 in the second piece 104. The processing circuit 406 also provides audio signals to a loudspeaker 112 in the second piece 104. An ambient light sensor 116 receives ambient light when the second piece is open. In operation, when ambient light is detected by the ambient light sensor 116, a signal is sent to the display driver circuit 412 and the processing circuit 406 to indicate that the normal mode of operation should be entered. When no ambient light is detected, a signal is sent to the display driver circuit 412 and the processing circuit 406 to indicate that the standby mode of operation should be entered. In the standby mode of operation, functions of the radiotelephone may be deactivated or operated at reduced power. For example, the display screen may be deactivated.

While the invention has been particularly shown and described with reference to a preferred embodiment, it will be understood by those skilled in the art that various changes in form and detail may be made therein without departing from the spirit and scope of the invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An electronic device operable in a first mode and a second mode, comprising:
   a) a first piece;
   b) a second piece moveable between an open position and a closed position with respect to the first piece;
   c) a processing circuit operable to control and switch operation of the electronic device between the first mode and the second mode; and
   d) an ambient light sensor operable to sense the position of the second piece with respect to the first piece and to signal the processing circuit to operate the electronic device in the first mode when the second piece is in an open position and in the second mode when the second piece is in the closed position
   wherein the first mode is selected from the group consisting of a deactivated mode, a standby mode, a reduced power consumption mode and a switched off mode, and the second mode is selected form the group consisting of a normal mode, an activated mode, an increased power consumption mode and a switched on mode.

2. An electronic device in accordance with claim 1, wherein the ambient light sensor is operated intermittently during operation of the device.

3. An electronic device in accordance with claim 1, wherein the ambient light sensor is located in the first piece and positioned such that ambient light is blocked by the second piece when the second piece is in the closed position.

4. An electronic device in accordance with claim 1, wherein the ambient light sensor is located in the second piece and positioned such that ambient light is blocked by the first piece when the second piece is in the closed position.

5. An electronic device in accordance with claim 1, further comprising a display for displaying information, wherein the display is deactivated when the device is in the deactivated mode when the ambient light sensor indicates that the second piece is in the closed position.

6. An electronic device in accordance with claim 1, further comprising a display for displaying information, wherein the display is operated in a display standby mode when the device is in the standby mode and the ambient light sensor indicates that the second piece is in the closed position.

7. An electronic device in accordance with claim 1, wherein the electronic device is a radiotelephone.

8. An electronic device in accordance with claim 1, wherein the second piece is moveably coupled to the first piece.

9. An electronic device in accordance with claim 1, wherein the second piece is separable from the first piece.

10. An electronic device in accordance with claim 1, wherein the electronic device enters the switched off mode when the second piece is in the closed position.

11. An electronic device in accordance with claim 1, wherein the electronic device enters at least one of the standby mode and the reduced vower consumption mode when the second piece is in the closed position.

12. An electronic device in accordance with claim 1, wherein the ambient light sensor has a light spectral sensitivity that approximates the light spectral response of the human eye.

13. A method of switching between operating modes in an electronic device according to whether the device is in a first closed position or in a second open position, the method comprising:

placing an ambient light sensor at a location on the electronic device where the sensor is exposed to ambient light when the electronic device is in the second open position and is shielded from ambient light when the electronic device is in the first closed position;

generating a signal by sensing ambient light falling on the ambient light sensor;

comparing the level of the signal to a threshold level;

determining whether the device is in the first closed position or the second open position according to the difference between the level of the signal and the threshold level;

operating the electronic device in a first mode if the device is in the first closed position and in a second mode if the device is in the second open position, the first mode being selected from the group consisting of a deactivated mode, a standby mode, a reduced power consumption mode and a switched off mode, the second mode being selected from the group consisting of a normal mode, an activated mode, an increased power consumption mode and a switched on mode.

14. A method in accordance with claim 13, wherein the threshold level is set such that even low levels of ambient light are detected when the device is not in the first closed position.

15. A method in accordance with claim 13, wherein comparing the level of the signal to a threshold level is performed intermittently.

* * * * *

UNITED STATES PATENT AND TRADEMARK OFFICE
CERTIFICATE OF CORRECTION

| | | |
|---|---|---|
| PATENT NO. | : 7,292,875 B2 | Page 1 of 1 |
| APPLICATION NO. | : 10/954405 | |
| DATED | : November 6, 2007 | |
| INVENTOR(S) | : Serene Seok Peng Chan et al. | |

It is certified that error appears in the above-identified patent and that said Letters Patent is hereby corrected as shown below:

Column 4, Line 31, Claim 1, delete "from" and insert -- form --;

Column 5, Line 6, Claim 11, delete "vower" and insert -- power --;

Column 6, Line 9 (Approx), Claim 13, delete "from" and insert -- form --;

Column 6, Line 11 (Approx), Claim 13, delete "from" and insert -- form --.

Signed and Sealed this

Seventeenth Day of August, 2010

David J. Kappos
*Director of the United States Patent and Trademark Office*